(12) United States Patent
Ono et al.

(10) Patent No.: US 6,557,596 B2
(45) Date of Patent: May 6, 2003

(54) LEAK FUEL GAS DISCHARGING STRUCTURE OF AUTOMOBILE

(75) Inventors: Tohru Ono, Wako (JP); Yozo Kami, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/076,523

(22) Filed: Feb. 19, 2002

(65) Prior Publication Data

US 2002/0112779 A1 Aug. 22, 2002

(30) Foreign Application Priority Data

Feb. 19, 2001  (JP) ........................................ 2001-042145

(51) Int. Cl.[7] ................................................. B65B 1/04
(52) U.S. Cl. .................. 141/311 A; 141/286; 220/86.2; 137/312; 137/355; 280/834
(58) Field of Search ................................. 137/312, 351, 137/354, 355; 141/311 A, 86, 67, 286; 220/86.2; 280/830, 834

(56) References Cited

U.S. PATENT DOCUMENTS

| 4,550,923 A | * | 11/1985 | Ogawa et al. ............... 280/834 |
| 5,701,928 A | * | 12/1997 | Aoki ........................... 137/312 |
| 6,017,061 A | * | 1/2000 | Adachi ........................ 280/834 |

* cited by examiner

Primary Examiner—Steven O Douglas
(74) Attorney, Agent, or Firm—Arent Fox Kintner Plotkin & Kahn, PLLC

(57) ABSTRACT

A leak fuel gas discharging structure for an automobile includes a hollow reinforcement member extending between a floor panel and a wheel house and interconnecting an underfloor space and an internal space of the wheel house. The wheel house has a portion facing a filler recess and having an opening which through which the filler recess and the internal space of the wheel house are connected together. The filler recess is normally closed by a filler lid with a clearance defined between a peripheral edge of the filler lid and a peripheral edge of the filler recess. By the structure thus arranged, a fuel gas, leaking from a fuel tank disposed in the underfloor space, is discharged outside the vehicle body.

10 Claims, 4 Drawing Sheets

LEAK FUEL GAS DISCHARGING STRUCTURE OF AUTOMOBILE

FIELD OF THE INVENTION

The present invention relates to a leak fuel gas discharging structure of an automobile that discharges a compressed fuel gas, leaking from a fuel tank, outside the automobile.

BACKGROUND OF THE INVENTION

Japanese Patent Laid-open Publication No. (HEI) 8-88544 discloses an automobile equipped with a fuel gas tank. The tank is disposed in a trunk room of the automobile and connected with an outlet of a gas supply pipe. The gas supply pipe has an inlet connected to a filler recess formed in a sidewall of the vehicle body. The filler recess is normally closed by a filler lid. The filler lid is adapted to be open so that a compressed fuel gas can be filled or charged through the gas supply pipe into the fuel gas tank.

The fuel gas tank may encounter a problem that the compressed fuel gas leaks from a body of the fuel gas tank or a connection between the fuel gas tank and the gas supply pipe. To deal with this problem, the disclosed automobile has a leak fuel gas discharging device or structure for discharging the leak compressed fuel gas outside the automobile.

The leak fuel gas discharging structure comprises a gas discharge pipe system having plural inlets that open to the interior of valve covers connected to the tank body and a single outlet that opens from the filler recess to the outside air. With this arrangement, the leak compressed fuel gas is discharged outside the automobile through the gas discharge pipe system.

Due to the use of the gas discharge pipe system, the conventional leak fuel gas discharging structure has a relatively large number of parts used and requires a relatively long assembling time. This constitutes a bar to cost-cutting of the automobile.

Additionally, the gas discharge pipe system requires a relatively large space for installation and hence lowers the degree of design freedom of the leak fuel gas discharging system.

SUMMARY OF THE INVENTION

It is accordingly an object of the present invention to provide a leak fuel gas discharging structure of an automobile, which is inexpensive to manufacture, is easy to assemble and has a higher degree of design freedom.

To achieve the foregoing object, according to the present invention, there is provided an automobile having a leak fuel gas discharging structure for discharging a compressed fuel gas, leaking from a fuel tank disposed in a space below a floor panel of the automobile, outside the automobile. The leak fuel gas discharging structure comprises: a wheel house having an internal space formed therein; a hollow reinforcement member extending between the floor panel and the wheel house and having a hollow channel interconnecting the space below the floor panel and the internal space of the wheel house; a body panel disposed on an exterior side of the wheel house and having a filler recess formed therein; and a filler lid attached to the body panel so as to open and close the filler recess, the filler recess being normally closed by the filler lid with a clearance defined between a peripheral edge of the filler recess and a peripheral edge of the filler lid. The wheel house has a portion corresponding in position to the filler recess and having an opening formed therein, the opening interconnecting the filler recess and the internal space of the wheel house. The hollow channel, the internal space, the filler recess and the clearance together form a continuous leak fuel gas discharge passageway extending from the space to the outside of the body panel thereby to allow the leak fuel gas to flow outside the automobile through the passageway.

It is preferable that the hollow reinforcement member is inclined upward in a direction from the floor panel toward the wheel house, the opening in the portion of the wheel house is disposed at a higher position than an upper end of the reinforcement member, and the clearance is disposed at a higher position than the opening.

The hollow reinforcement member may be tapered in a direction from the floor panel toward the wheel house. Further, the hollow reinforcement member may be aligned with the portion of the wheel house.

The hollow channel of the reinforcement member has a rectangular cross section or a circular cross section. When used with hydrogen gas or a like gaseous fuel much lighter than air, the hollow channel of the reinforcement member may be open downward.

DESCRIPTION OF THE PREFERRED EMBODIMENTS

Figure 1:
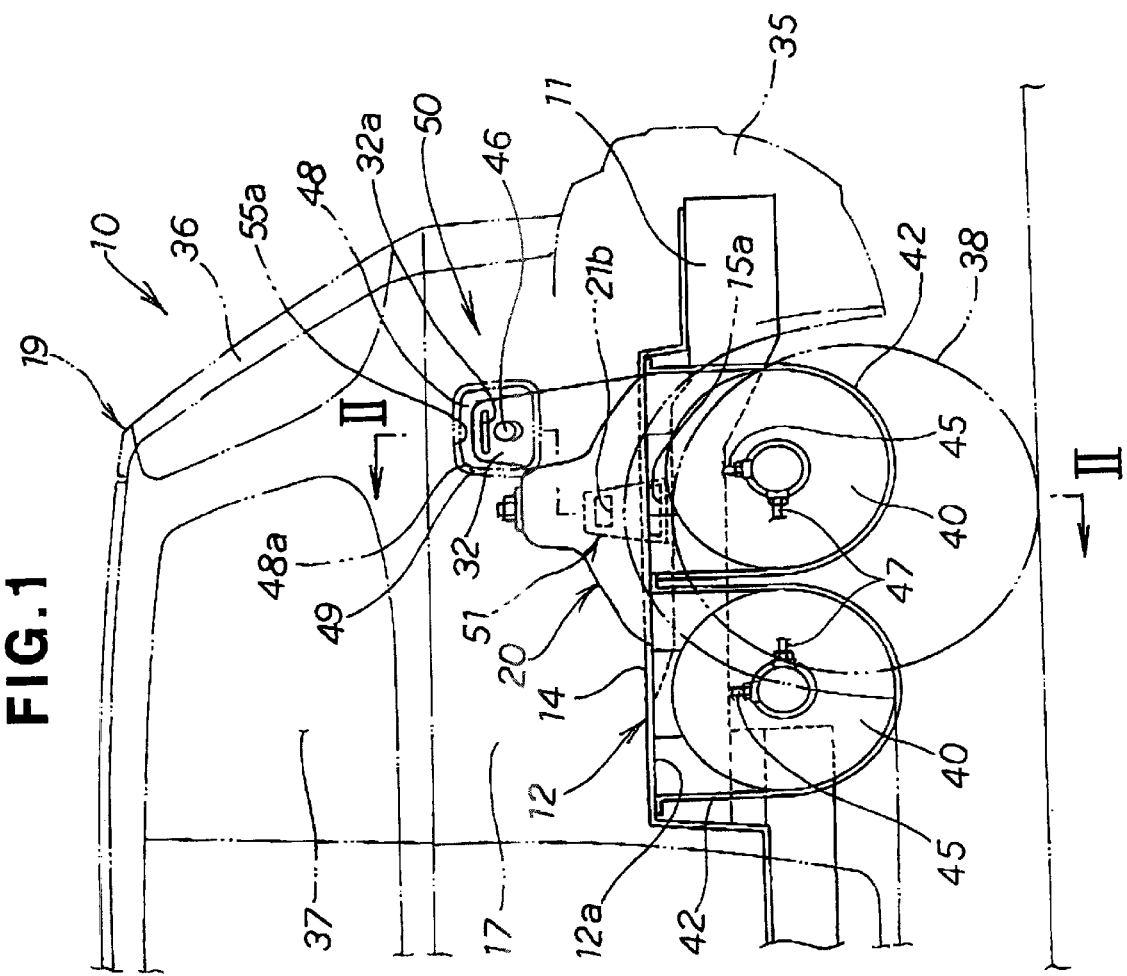
FIG. 1 is a side view of a rear portion of an automobile incorporating therein a leak fuel gas discharging structure according to an embodiment of the present invention.

Referring now to the drawings and FIG. 1 in particular, there is shown a rear part of an automobile 10 incorporating a leak fuel gas discharging structure 50 according to an embodiment of the present invention. The automobile 10 includes a body 19 having a side frame 11, a floor panel 12, a side plate or panel 17 and a wheel house 20. A rear left wheel 38 of the automobile 10 is disposed below the wheel house 20. The automobile 10 further has two fuel tanks 40, 40 disposed tandem in the longitudinal (front-to-fear) direction of the automobile 10. The fuel tanks 40, 40 are formed from a synthetic resin material and attached to the underside 12a of the floor panel 12 by means of a pair of fastening straps (one being shown) 42. The fuel tanks 40, 40 are connected to a filler orifice 46 via a bifurcated filler tube 45. The filler orifice 46 is disposed on a portion 32 of the wheel house 20 facing a filler lid 48. The filler lid 48 is attached by a hinge (not shown) to the side panel 17 and normally closes a filler recess 55 (FIG. 2) formed in the side plate 17, with a clearance 49 being defined between a peripheral edge 48a of the filler lid 48 and a peripheral edge 55a of the filler recess 55. The filler recess 55 accommodates within it the filler or if ice 46. The filler lid 48 is adapted to be opened so that a compressed fuel gas, such as hydrogen gas, can be filled or charged from the filler orifice 46 through the filler tube 45 into the fuel tanks 40, 40. The filler recess 55 and the clearance 49 form part of the leak fuel gas discharge structure 50.

The automobile 10 in the illustrated embodiment comprises a fuel cell powered vehicle equipped with a fuel cell (not shown) as a power source for propelling an electric motor (not shown) in which hydrogen gas contained in the fuel tanks 40 is supplied to an anode of the fuel cell. The hydrogen gas, due to its extremely smaller density than air, will rise in the atmosphere. Furthermore, the hydrogen gas has a very small molecular size and hence it can permeate, in a very small amount, through a certain material such as rubber or synthetic resin. Accordingly, in the case of the fuel tanks 40 formed from synthetic resin, as in the illustrated embodiment, leakage of hydrogen gas may occur. The fuel tanks 40 may be formed form other materials than the synthetic resin. In FIG. 1 reference numerals 35, 36 and 37 denote a rear bumper, tailgate window glass and rear side window glass, respectively.

Figure 2:
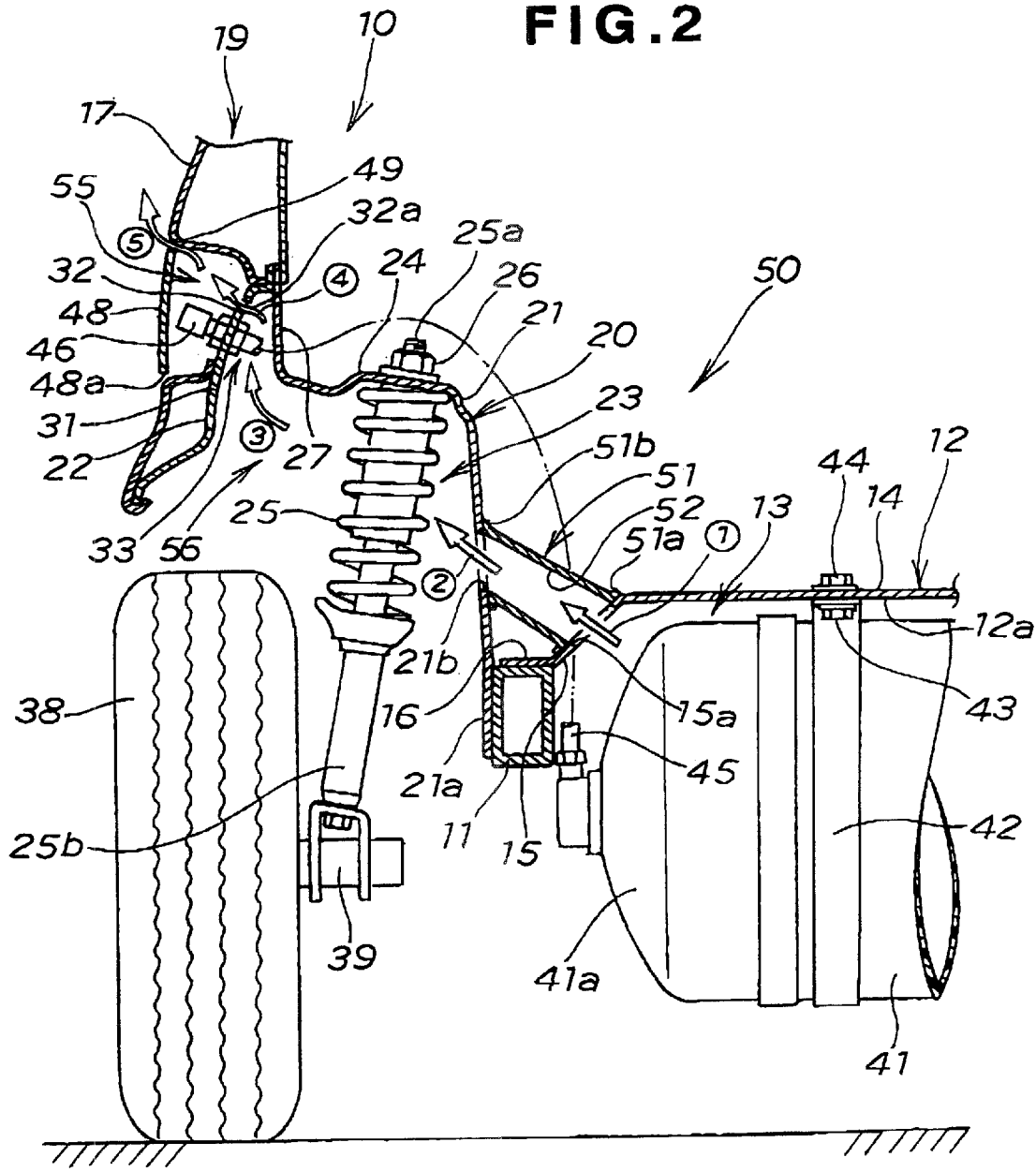
FIG. 2 is a cross-sectional view taken along line II—II of FIG. 1.

As shown in FIG. 2, the leak fuel gas discharging structure 50 is designed such that hydrogen gas (fuel gas), leaking from the fuel tanks 40) into an underfloor space 13 defined below the floor panel 12, is discharged outside the body 19 of the automobile 10 through a continuous leak fuel gas discharge passageway 56. To this end, the leak fuel gas discharging structure 50 includes a hollow reinforcement member 51 extending from the floor panel 12 to the wheel house 20 at an angle of upward inclination to the horizontal The hollow reinforcement member 51 serves as a reinforcement member which reinforces or strengthens the wheel house 20. The hollow reinforcement member 51 has a hollow channel 52 interconnecting the underfloor space 13 and an internal space 23 of the wheel house 20. The wheel house portion 32, which faces the fuel lid 48, has an opening 32a through which the internal space 23 of the wheel house 20 communicates with the filler recess 55. The filler recess 55 opens to the atmosphere through the clearance 49 normally defined between the peripheral edge 48a of the filler lid 48 and the peripheral edge 55a of the filler recess 55. The hollow channel 52 of the reinforcement member 51, the internal space 23 of the wheel house 20, the filler recess 55 and the clearance 48a formed around the filler lid 48 together form the above-mentioned continuous leak fuel gas discharge passageway 56.

The hollow reinforcement member 51 inclines upward when viewed from the floor panel 12. The opening 32a formed in the wheel house portion 32 comprises a horizontal slit (FIG. 3) and is disposed at a position higher than an upper end of the hollow reinforcement member 51. The clearance 49 formed around the filler lid 48 has an upper portion disposed at a higher position than the slit-like opening 32a. Thus, the leak fuel gas discharge passageway 56 as a whole has an upward inclination when viewed from the tanks 40. This arrangement ensures that the leak hydrogen gas (fuel gas) much lighter than air is guided to move upward along the leak fuel gas discharge passageway 56 and finally discharged from the clearance 49 to the outside of the automobile 10, as indicated by the profiled arrows ①  to ⑤ shown in FIG. 2.

The floor panel 12 has a flat central portion 14 forming a floor of the vehicle body 19, a downwardly sloped side portion 15 contiguous to a left end of the flat central portion 14, and a flat mounting edge 16 contiguous to the left end (lower end) of the sloped side portion 15 and attached to an upper wall of the side frame 11. The underfloor space 13 is defined between the flat central portion 14 and the downwardly sloped side portion 15 of the floor panel 12. The side portion 15 has an opening 15a through which the underfloor space 13 communicated with the hollow channel 52 of the reinforcement member 51.

The fastener strap 42 for mounting the fuel tanks 40 to the underside 12a of the floor panel 12 has opposite ends each secured to the underside 12a by a screw fastener composed of a bolt 43 and a nut 44 threadedly engaged with the bolt 43. Each fuel tank 40 has one end portion (left end portion in FIG. 2) 41a connected to an end of a filler tube 45 and an end of a supply tube 47 (FIG. 1). The opposite end of the filler tube 45 is connected to the filler orifice 46, and the opposite end of the supply tube 47 is connected to the fuel cell (not shown). The hydrogen gas (fuel gas) is charged into each fuel tank 40 through the filler tube 45 and is supplied to the non-illustrated fuel cell through the supply tube 47 (FIG. 1).

The wheel house 20 has a generally inverted U-shaped cross section and is formed by an inner wall 21 and an outer wall 22 connected together at upper ends, so as to define therebetween the internal space 23. The inner wall 21 has a lower end portion 21a attached to an outer wall of the side frame 11, a central portion configured to form a mount seat 24 for a rear suspension 25, and an upright upper end portion 27 connected to an upper end portion 31 of the outer wall 22. The upper end portion 31 of the outer wall 22 is swelling outward away from the inner wall 21, so that there is a generally triangular space 33 formed between the respective upper end portions 27, 31 of the inner and outer walls 21, 22 at an upper end of the internal space 23. The wheel house portion 32, which faces the filler recess 55, is formed on the outwardly swelled upper end portion 31 of the outer wall 22 and has the slit-like opening 32a formed in proximity with the filler orifice 46. The slit-like opening 32a is located at a higher position than the filler orifice 46.

The rear suspension 25 has an externally threaded upper end portion 25a connected by a nut 26 to the mount seat 24 of the wheel house 20, and a lower end portion 25b connected via a bracket 39 to the rear wheel 38.

Figure 3:
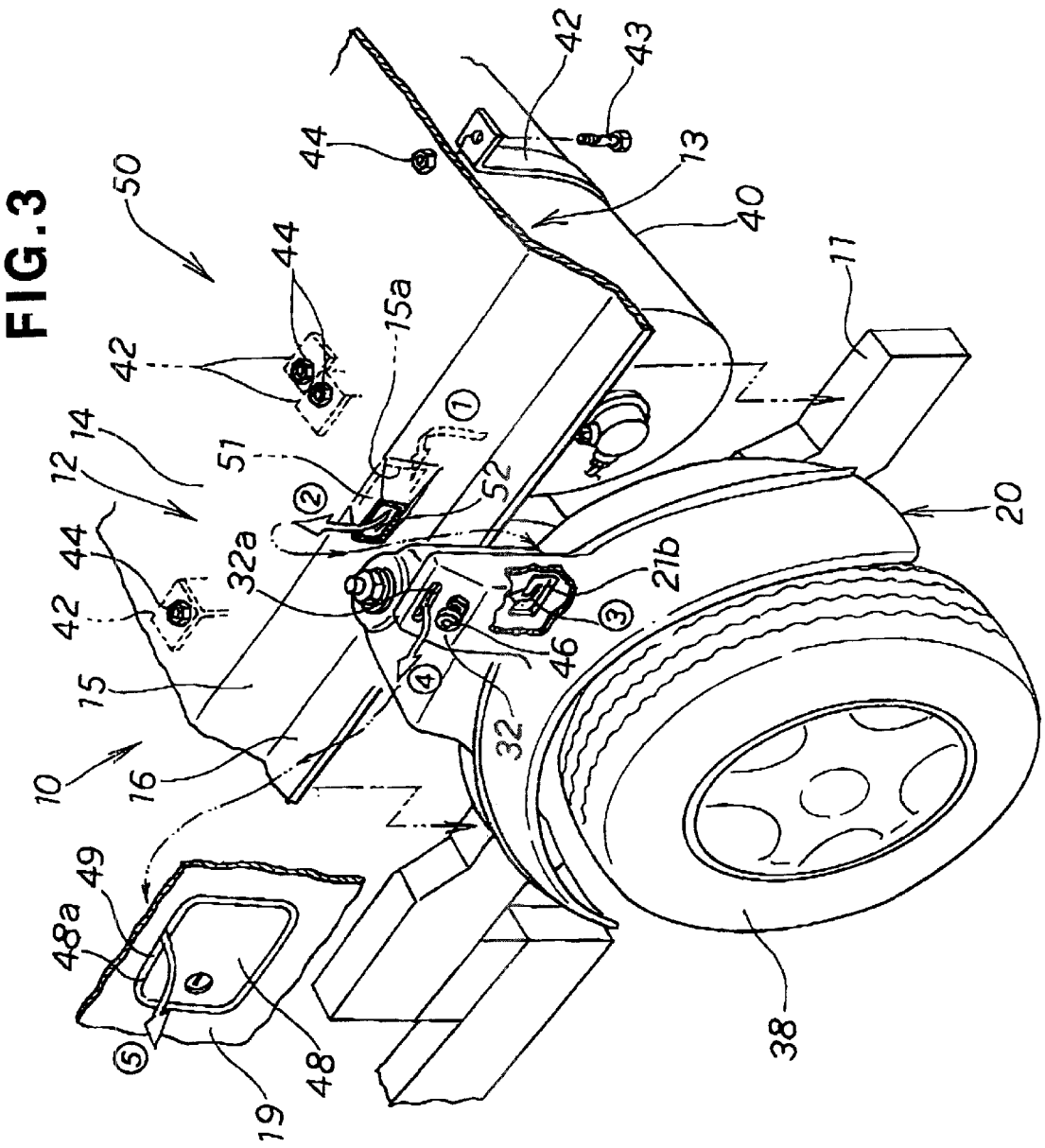
FIG. 3 is an exploded perspective view, with parts broken away for clarity, of a main portion of the leak fuel gas discharging structure.

The follow reinforcement member 51 comprises a hollow duct of a rectangular cross section and has a lower end 51a surrounding the opening 15a of the sloped side portion 15 of the floor panel 12 and an upper end 51b surrounding an opening 21b formed in the inner wall 21 of the wheel house 20. Thus, the hollow channel 52 of the reinforcement member 51 communicates with the underfloor space 13 through the opening 15a and also with the internal space 23 of the wheel house 20 through the opening 21b. The hollow channel 52 of the reinforcement member 31 has a longitudinal axis substantially aligned with the wheel house portion 32 where the opening 32a and the filler or if ice 46 are provided. As best shown in FIG. 3, the reinforcement member 31 formed in the shape of a hollow duct is tapered toward the upper end 51b (FIG. 2) so that the rectangular cross section of the tapered reinforcement member 51 decreases progressively in a direction from the lower end 51a to the upper end 51b. The opening 15a formed in the sloped side portion 15 of the floor panel 12 has a rectangular shape substantially the same in size as the cross-sectional shape of the hollow channel 51 at the lower end 51a of the reinforcement member 51. Similarly, the opening 21b formed in the inner wall 21 of the wheel house 20 has a rectangular shape substantially the same in size as the cross-sectional shape of the hollow channel 51 at the upper end 51b of the reinforcement member 51. By the upwardly tapering hollow reinforcement member 51, the leak hydrogen gas (fuel gas) is directed concentratedly toward the wheel house portion 32.

Operation of the leak fuel gas discharging structure 50 of the foregoing construction will be described below with reference to FIGS. 2 and 3. Hydrogen gas (fuel gas) leaking from the tank 40 into the underfloor space 13 enters the hollow channel 52 of the reinforcement member 51 through the opening 15a, as indicated by the profiled arrow ①. This is because the hydrogen gas is much lighter than air and hence rises in the atmosphere. The leak hydrogen gas is then guided to flow upward along the hollow channel 52 of the reinforcement member 51. Subsequently, the leak hydrogen gas flows out from the hollow channel 51 of the reinforcement member 51 and enters into the internal space 23 of the wheel house 20 via the opening 21b, as indicated by the profiled arrow ②. In this instance, partly due to the upwardly tapered configuration of the reinforcement member 51 and due to the hollow channel 52 aligned with the wheel house portion 32, the leak hydrogen gas is directed concentratedly toward the wheel house portion. Then, the leak hydrogen gas flows upwardly and outwardly across the internal space 23 and impinges upon an inner surface of the outwardly swelled upper end portion 31 of the outer wall 22 including the wheel house portion 32. In this instance, by virtue of the upper end portion 31 curved toward the upper end portion 27 of the inner wall 21, the leak hydrogen gas is introduced into the narrow triangular space 33 formed behind the wheel house portion 32 at an upper end of the internal space 23 of the wheel house 20, as indicated by the profiled arrow ③. The leak hydrogen gas subsequently flows into the filler recess 55 via the slit-like opening 32a, as indicated by the profiled arrow ④, and finally it is discharged from the clearance 49 to the outside of the vehicle body 19, as indicated by the profiled arrow ⑤.

It will be appreciated that the leak fuel gas discharging structure 50 of the present invention can readily be formed by merely providing a hollow reinforcement member 51 and forming three openings 15a, 21b and 32a and does not require substantial reconstruction of the vehicle body 19. Additionally, the leak fuel gas discharging structure 50 does not have a complicated gas discharge pipe system as in the case of the conventional device and, hence, is simple in construction, is easy to assemble and can be manufactured at a relatively low cost The reinforcement member 51, as opposed to the conventional gas discharge pipe system, occupies only a small space for installation thereof and secures a higher degree of design freedom of the vehicle body 19. Since the clearance 49, formed around the filler lid 48 when the filler recess 55 is closed by the filler lid 48, is used as a discharge opening of the leak fuel gas discharging structure 50, there is no need to form a separate discharge opening in the side panel 17 of the vehicle body 19, which may deteriorate the external appearance of the vehicle body 19.

Figure 4:
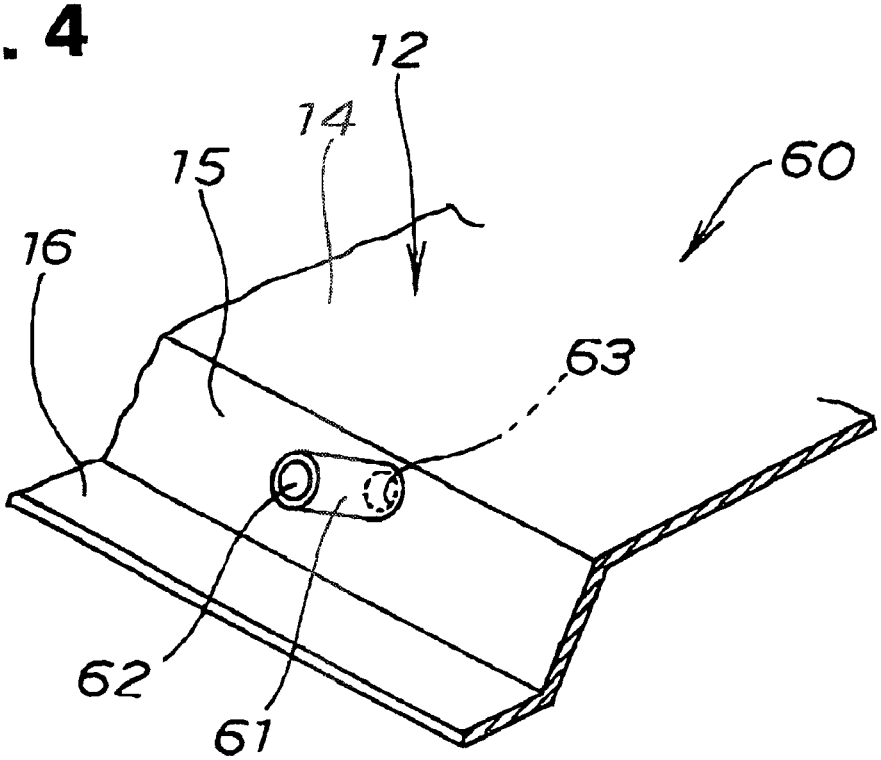
FIG. 4 is a fragmentary perspective view showing a modified form of the leak fuel gas discharging structure.

FIG. 4 shows a part of a leak fuel gas discharging structure 60 according to a second embodiment of the present invention. The leak fuel gas discharging structure 60 differs from the structure 50 of the first embodiment shown in FIGS. 1–3 only in that a hollow cylindrical reinforcement member 61 is used in place of the hollow rectangular reinforcement member 51. The reinforcement member 61 has a hollow channel 62 of a circular cross section, and the downwardly sloped side portion 1 of the floor panel 12 has a circular hole or opening 63 of a diameter substantially the same as that of the hollow circular channel 62 at a lower end of the reinforcement member 61. The reinforcement member 61 in the illustrated embodiment has a uniform cross-sectional area throughout the length thereof. The reinforcement member 61 may be tapered in the same manner as the first embodiment. Use of the hollow circular reinforcement member 61 enables structural simplification of the leak fuel gas discharging structure 60.

Figure 5:
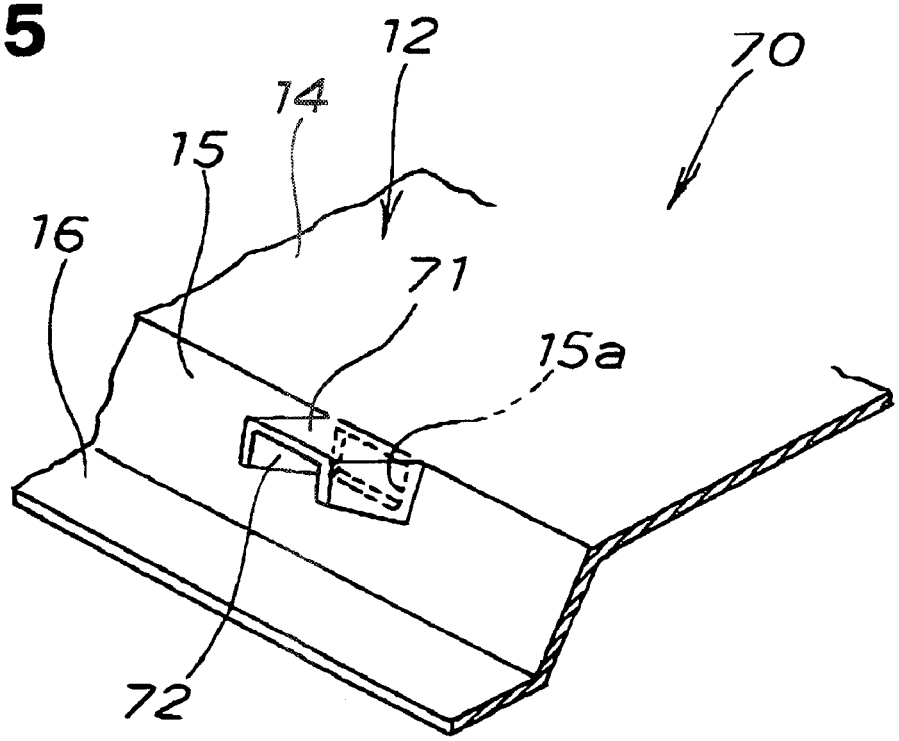
FIG. 5 is a view similar to FIG. 4, but showing another modified form of the leak fuel gas discharging structure.

FIG. 5 shows a part of a leak fuel gas discharging structure 70 according to a third embodiment of the present invention. The leak fuel gas discharging structure 70 is substantially the same as the structure 50 of the first embodiment shown in FIGS. 1–3 with the exception that a hollow reinforcement member 71 has an inverted U-shaped cross section and has a hollow channel 72 open downward. Since hydrogen gas is much lighter than air and will rise in the atmosphere, the inverted U-shaped hollow reinforcement member 71 can perform the same guiding function as the hollow rectangular reinforcement member 51 (FIG. 3) with respect to the leak hydrogen gas (fuel gas). Use of the channel-shaped reinforcement member 71 achieves a certain reduction in weight and cost of the leak fuel gas discharging structure 50.

In the illustrated embodiment, the opening 32 formed in the wheel house portion 32 comprises a horizontally extending slit (FIG. 3). The slit 32a may be replaced with any other form of opening. Additionally, the fuel gas used with the leak fuel gas discharging structure 50 is not limited to hydrogen gas in the illustrated embodiment but may includes other gases, such as liquefied natural gases.

Obviously, various minor changes and modifications are possible in the light of the above teaching. It is to be understood that within the scope of the appended claims the present invention may be practiced otherwise than as specifically described.

The present disclosure relates to the subject matter of Japanese Patent Application No. 2001-42145, filed Feb. 19, 2001, the disclosure of which is expressly incorporated herein by reference in its entirety

What is claimed is:

1. An automobile having a leak fuel gas discharging structure for discharging a compressed fuel gas, leaking from a fuel tank disposed in a space below a floor panel of the automobile, outside the automobile, said leak fuel gas discharging structure comprising:

a wheel house having an internal space formed therein;

a hollow reinforcement member extending between the floor panel and the wheel house and having a hollow channel interconnecting the space below the floor panel and the internal space of the wheel house;

a body panel disposed on an exterior side of the wheel house and having a filler recess formed therein;

a filler lid attached to the body panel so as to open and close the filler recess, the filler recess being normally closed by the filler lid with a clearance defined between a peripheral edge of the filler recess and a peripheral edge of the filler lid;

the wheel house having a portion corresponding in position to the filler recess and having an opening formed therein, said opening interconnecting the filler recess and the internal space of the wheel house; and the hollow channel, the internal space, the filler recess and the clearance together forming a continuous leak fuel gas discharge passageway extending from the space to the outside of the body panel thereby to allow the leak fuel gas to flow outside the automobile through the passageway.

2. The automobile according to claim 1, wherein the hollow reinforcement member is inclined upward in a direction from the floor panel toward the wheel house, the opening in the portion of the wheel house is disposed at a higher position than an upper end of the reinforcement member, and the clearance is disposed at a higher position than the opening.

3. The automobile according to claim 2, wherein the hollow reinforcement member is tapered in the direction from the floor panel toward the wheel house.

4. The automobile according to claim 3, wherein the hollow reinforcement member is aligned with the portion of the wheel house.

5. The automobile according to claim 1, wherein the hollow reinforcement member is tapered in a direction from the floor panel toward the wheel house.

6. The automobile according to claim 5, wherein the hollow reinforcement member is aligned with the portion of the wheel house.

7. The automobile according to claim 1, wherein the hollow reinforcement member is aligned with the portion of the wheel house.

8. The automobile according to claim 1, where in the hollow channel of the reinforcement member has a rectangular cross section.

9. The automobile according to claim 1, where in the hollow channel of the reinforcement member has a circular cross section.

10. The automobile according to claim 1, wherein the hollow channel of the reinforcement member is open downward.

* * * * *